(12) United States Patent  
Klakow

(10) Patent No.: US 6,314,400 B1
(45) Date of Patent: Nov. 6, 2001

(54) METHOD OF ESTIMATING PROBABILITIES OF OCCURRENCE OF SPEECH VOCABULARY ELEMENTS

(75) Inventor: Dietrich Klakow, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/396,086

(22) Filed: Sep. 14, 1999

(30) Foreign Application Priority Data

Sep. 16, 1998 (DE) .............................................. 198 42 404

(51) Int. Cl.$^7$ ...................................................... G10L 15/06
(52) U.S. Cl. ............................................ 704/257; 704/255
(58) Field of Search ................................... 704/257, 231, 704/232, 240, 241, 243, 251, 256, 250, 255

(56) References Cited

U.S. PATENT DOCUMENTS

| | | | | |
|---|---|---|---|---|
| 4,831,550 | * | 5/1989 | Katz ...................................... | 704/240 |
| 5,293,584 | * | 3/1994 | Brown et al. ......................... | 704/277 |
| 5,467,425 | * | 11/1995 | Lau et al. .............................. | 704/243 |
| 5,640,487 | * | 6/1997 | Lau et al. .............................. | 704/243 |

OTHER PUBLICATIONS

R. Kneser, V. Steinbiss, "On The Dynamic Adaptation of Stochastic Language Models", Proc.ICASSP. pp. 586–589, 1993.

R. Kneser, J. Peters and D. Klakow, "Language Model Adaptation Using Dynamic Marginals", Eurospeech, pp. 1971–1984, 1997.

"Numerical Recipes", William H. Press et al, Cambridge University Press, 1989, Chapter 10.4.

* cited by examiner

Primary Examiner—Tālivaldis Ivars Šmits
Assistant Examiner—Daniel Abebe
(74) Attorney, Agent, or Firm—Daniel J. Piotrowski

(57) ABSTRACT

The invention relates to a method of estimating probabilities of occurrence of speech vocabulary elements in a speech recognition system. By modification of the linguistic speech modeling, further alternatives for reducing the error rate and perplexity of a speech recognition system are proposed. The method according to the invention is characterized in that, in the estimation of a probability of occurrence of a speech vocabulary element, several M-gram probabilities of this element are raised to a higher power by means of an M-gram-specific optimized parameter value, and the powers thus obtained are multiplied by each other, in which the estimation of the probability of occurrence of a speech vocabulary element does not include the case where an M-gram probability with M>1 estimated by means of a first training vocabulary corpus for the speech vocabulary element is multiplied by a quotient raised to a higher power by means of an optimized parameter value, which optimized parameter value is determined by means of the GIS algorithm, and a unigram probability of the element estimated by means of a second training vocabulary corpus serves as a dividend of the quotient, and a unigram probability of the element estimated by means of the first training vocabulary corpus serves as a divisor of the quotient.

6 Claims, 1 Drawing Sheet

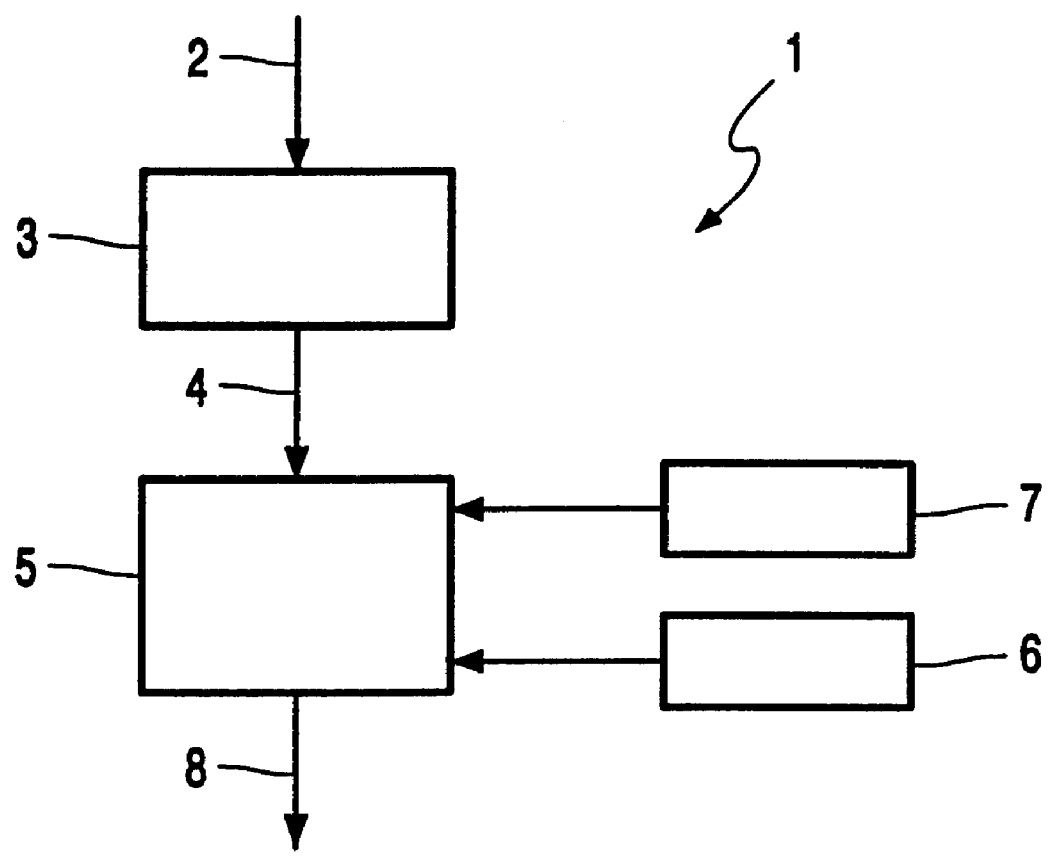

METHOD OF ESTIMATING PROBABILITIES OF OCCURRENCE OF SPEECH VOCABULARY ELEMENTS

BACKGROUND OF THE INVENTION

The invention relates to a method of estimating probabilities of occurrence of speech vocabulary elements in a speech recognition system.

In speech recognition systems based on static models, an acoustic speech modeling and a linguistic speech modeling are used. The invention relates to the field of linguistic speech modeling.

It is known to determine probabilities of occurrence of elements of a speech vocabulary by a linear combination of different M-gram probabilities of these elements. It is known from R. Kneser, V. Steinbiss, "On the dynamic adaptation of stochastic language models", Proc. ICASSP, pp. 586–589, 1993 that, for forming probabilities of occurrence of bigram vocabulary elements, a plurality of probabilities of occurrence determined for different training vocabulary corpuses of these bigram vocabulary elements is combined linearly so as to form probabilities of occurrence of these elements.

It is also known from R. Kneser, J. Peters and D. Klakow, "Language Model Adaptation using Dynamic Marginals", (see formulas (8) and (9)), EUROSPEECH, pp. 1971–1974, 1997 that, in the estimation of the probability of occurrence of a speech vocabulary element, an M-gram probability with M>1 estimated by means of a first training vocabulary corpus for the speech vocabulary element is multiplied by a quotient raised to the power by means of an optimized parameter value, which optimized parameter value is determined by means of the GIS algorithm (Generalized Iterative Scaling), and a unigram probability of the element estimated by means of a second training vocabulary corpus serves as a dividend of the quotient, and a unigram probability of the element estimated by means of the first training vocabulary corpus serves as a divisor of the quotient. The error rate and the perplexity of a speech recognition system can be reduced with this formulation.

SUMMARY OF THE INVENTION

It is an object of the invention to provide further alternatives by modification of the linguistic speech modeling, with which alternatives the error rate and perplexity of a speech recognition system can be reduced.

This object is solved in that, in the estimation of a probability of occurrence of a speech vocabulary element, several M-gram probabilities of this element are raised to a higher power by means of an M-gram-specific optimized parameter value, and the powers thus obtained are multiplied by each other.

Suitable as M-grams are, for example, unigrams, bigrams, gap bigrams or trigrams comprising the relevant speech vocabulary element. The solution according to the invention is based on the formulation of minimizing the Kullback-Leibler distance as regards the different M-gram probabilities and the resultant probability of occurrence by means of the described combination of M-gram probabilities. The invention provides an effective combination of known linguistic speech models which are determined by the probability (of occurrence) of the corresponding vocabulary elements. This leads to probabilities of the speech vocabulary elements which are better adapted to the selected field of application, and to an improved linguistic speech model for the speech recognition system.

The following case does not fall within the protective scope of the invention ("disclaimer"). In the estimation of the probability of occurrence of a speech vocabulary element, an M-gram probability with M>1 estimated by means of a first training vocabulary corpus for the speech vocabulary element is multiplied by a quotient raised to a higher power by means of an optimized parameter value, which optimized parameter value is determined by means of the GIS algorithm, and a unigram probability of the element estimated by means of a second training vocabulary corpus serves as a dividend of the quotient, and a unigram probability of the element estimated by means of the first training vocabulary corpus serves as a divisor of the quotient.

This case, which does not fall within the protective scope of the invention, is already known from the article by R. Kneser, J. Peters and D. Klakow, "Language Model Adaptation using Dynamic Marginals", EUROSPEECH, pp. 1971–1974, 1997, in which this formulation is based on the use of the known GIS algorithm and leads only to this one special solution but not to the other cases within the protective scope of the invention.

In one embodiment of the invention, a first training vocabulary corpus is used for estimating a first part of the M-gram probabilities, and a first part of a second training vocabulary corpus is used for estimating a second part of the M-gram probabilities, and a second part of the second training vocabulary corpus is used for determining the optimized parameter values assigned to the M-gram probabilities. In this way, vocabularies of different size can be integrated in the model formation, which, with different degrees, are adapted to special applications. For example, the first training vocabulary corpus is preferably an application-unspecific vocabulary corpus such as, for example the NAB corpus (North American Business News). The second vocabulary corpus preferably consists of vocabulary elements from one or more example texts about given special fields of application, for example, the judicial field. When the second training vocabulary corpus is chosen to be the considerably smaller corpus as compared with the first training vocabulary corpus, the linguistic speech model may be adapted to special applications with little effort. Also the parameter values used for model adaptation are determined by means of the second training vocabulary corpus so as to minimize the processing effort.

For determining the optimized parameter values, the optimizing function $$F(\{\lambda_i\}) = \sum_{hw} f(hw) \log\left( \frac{1}{Z_\lambda(h)} \prod_i p_i(w|h)^{\lambda_i} \right)$$

is minimized, wherein $\lambda_i$ represents the parameter values to be optimized, hw represents M-grams for a vocabulary element w with a history h of previous vocabulary elements, f(hw) represents the quotient with the number of counted M-grams occurring in a training phase of the second part of the second vocabulary as a dividend, and the number of vocabulary elements of the second vocabulary as a divisor, $1/Z_\lambda(h)$ represents a scaling factor, and $p_i$ represents the estimated probability of occurrence of the vocabulary element w, given the history h. This optimizing function representing a probability function with the parameters $\lambda_i$ as variables is convex and has a single maximum for a given set of parameter values $\lambda_i$ which can be determined by means of conventional methods of approximation. An explicit determination of Kullback-Leibler distances is avoided in this way.

When only M-gram probabilities with M<3 are used in the formation of an improved linguistic speech model according to the invention, the required memory space for computers, with which the speech recognition is to be performed, may remain small. For model formation, unigrams, bigrams and particularly gap bigrams are used in this case.

The invention also relates to a speech recognition system using a speech vocabulary with vocabulary elements to which probabilities of occurrence are assigned, which are estimated by means of a method as described hereinbefore.

These and other aspects of the invention are apparent from and will be elucidated with reference to the embodiment(s) described hereinafter.

BRIEF DESCRIPTION OF THE DRAWING

The features and advantages of the present invention can be understood by reference to the detailed description of the preferred embodiments set forth below taken with the drawings, in which:

FIG. 1 is a speech recognition system in accordance with the teachings of the present invention.

DETAILED DESCRIPTION OF THE INVENTION

The sole Figure shows a speech recognition system 1 receiving speech signals in an electric form at its input 2. In a function block 3, an acoustic analysis is performed, causing the output 4 to supply successive characteristic vectors defining the speech signals. In the acoustic analysis, the speech signals which are present in an electric form are sampled, quantized and subsequently combined in frames. Consecutive frames may partially overlap each other. A characteristic vector is formed for each single frame. In the function block 5, the search for the sequence of speech vocabulary elements is performed, which, for the given input of the sequence of characteristic vectors, is most probable. As is customary in speech recognition systems, the probability of the recognition results is maximized by means of the so-called Bayes' formula. In this case, both an acoustic model of the speech signals (function block 6) and a linguistic speech model (function block 7) is included in the processing operations represented by function block 5. The acoustic model in accordance with function block 6 comprises the usual application of so-called HMM models (Hidden Markov Models) for modeling separate vocabulary elements, or also a combination of a plurality of vocabulary elements. The speech model (function block 7) comprises estimated probabilities of occurrence of the single elements of the speech vocabulary on which the speech recognition system 1 is based. The invention to be further described hereinafter is based thereon, leading to a reduction of the error rate of the recognition result supplied from the output 8. Moreover, the perplexity of the system is reduced.

It will hereinafter be assumed that there are already conditioned probabilities of occurrence $p_i(w|h_i)$ for an element w of the speech vocabulary used, where an element w may be a word, a part of a word or also a succession of words or word parts. $h_i$ represents the history relating to the element w, i.e. given previous vocabulary elements. Dependent on the history $h_i$, $p_i$ may be a unigram, bigram, trigram, . . . probability. However, also gap bigrams or gap trigrams or gap M-grams of a higher-order M may be included in the modeling. In such models, the history $h_i$ has gaps, i.e. the history $h_i$ is not based on directly successive vocabulary elements. The presence of such probabilities of occurrence $p_i$ may be assumed. They are generally determined from appropriate text corpuses.

The invention utilizes these given M-gram probabilities $p_i$ and supplies, after a suitable combination thereof, an estimated new probability of occurrence $p(w|h)$, i.e. the probability for the speech vocabulary element w, given a history h of previous vocabulary elements.

To determine the optimal value for this probability of occurrence p, the initial starting point will be the Kullback-Leibler distance $$D(p\|p_i)=d_i, i=1, \ldots N$$

The Kullback-Leibler distance is a mathematical expression. Its definition can be read, for example, in the book by T. M. Cover, J. A. Thomas, "Elements of Information Theory", Wiley-Interscience Publication, chapter 2.3.

Starting from this distance, an overall distance D in accordance with $$D = D(p\|p_0) + \sum_{i=1}^{N} \mu_i(D(p'\|p_i) - d_i)$$

is defined. Here, $p_0$ is a probability value with the assumption of an equal distribution of the corresponding speech vocabulary elements. p' is a variable for the probability of occurrence p to be determined. The optimal p' is obtained from the probability of occurrence p to be calculated. The $\mu_i$ are so-called Lagrange multipliers whose determination within the method of approximation is also defined and known. In this respect, the above-mentioned book by T. M. Cover, J. A. Thomas is referred to.

The overall distance D is now determined by means of one of the conventional methods of approximation for such problems (see also said book by T. M. Cover, J. A. Thomas). The problem has a closed solution. To simplify the representation of the solution, an optimized parameter value $\lambda_i$ is defined while using the Lagrange multipliers $\mu_1$ in accordance with $$\lambda_i = \frac{\mu_i}{1 + \sum_{i=1}^{N} \mu_i}$$

Starting from this deduction, the following formula is obtained for the searched probability of occurrence p $$p(w|h) = \frac{1}{Z_\lambda(h)} \prod_{i=1}^{N} p_i(w|h_i)^{\lambda_i}$$

in which $Z_\lambda(h)$ is a scaling factor determined by $$Z_\lambda(h) = \sum_{w} \prod_{i=1}^{N} p_i(w|h_i)^{\lambda_i}$$

in which the summation covers all elements w of the training vocabulary corpus used for determining the optimized parameter values $\lambda_i$. For estimating the probability of occurrence p for the element w of the corresponding speech vocabulary, different M-gram probabilities $p_i(w|h_i)$ are combined with each other. Dependent on the histories $h_i$, the $p_i$ represent unigram, bigram, trigram, . . . probabilities. Also gap bigram, gap trigram, . . . probabilities qualify as $p_i$. The probability values Pi are initially raised to a higher power by means of a specific parameter value $\lambda_i$ optimized for the relevant M gram. The N powers thus obtained are subsequently multiplied by each other, followed by a scaling operation by division by the scaling factor $Z_\lambda(h)$.

The optimized parameter values $\lambda_i$ are determined in a training phase of the speech recognition system by means of an optimizing function F in accordance with $$F(\{\lambda_i\}) = \sum_{hw} f(hw) \log\left(\frac{1}{Z_\lambda(h)} \prod_{i=1}^{N} p_i(w|h)^{\lambda_i}\right)$$

wherein $\lambda_i$ represents the parameter values to be optimized, hw represents M-grams for a vocabulary element w with a history h of previous vocabulary elements, f(hw) represents the quotient with the number of counted M-grams occurring in a training phase of the second part of the second vocabulary as a dividend, and the number of vocabulary elements of the second vocabulary as a divisor, $1/Z_\lambda(h)$ represents a scaling factor, and $p_i$ represents the estimated probability of occurrence of the vocabulary element w, given the history h. This function F is to be maximized in the relevant training phase of the speech recognition system.

When constructing the linguistic speech model to be used for the speech recognition system, both a first training corpus of a general nature and a second training vocabulary corpus of a specific nature are used. The first training corpus is, for example, the NAB corpus, which is generally available and is formed from the probabilities of occurrence for the speech vocabulary elements in this corpus. The training vocabulary corpus of a specific nature comprises, for example, speech vocabulary elements of texts in the judicial field or given technical fields. The additional effort for improving the probabilities of occurrence of speech vocabulary elements in accordance with the invention is preferably only necessary for the specific training vocabulary corpus. A first part of this training corpus is therefore used for determining the probability values pi, and the second part of the specific training vocabulary corpus is used for determining the optimized parameter values $\lambda_i$.

The function F defines an optimizing function relating to the second part of the specific training vocabulary corpus, which—as already stated above—is to be maximized. The function F is convex and has a single unambiguous maximum. For its calculation, several multidimensional optimization or approximation methods are available, for example the so-called Simplex algorithm which is described in W. H. Press et al, "Numerical Recipes", Cambridge University Press, 1989, chapter 10.4. A first preferred use of the invention is the construction of speech models which are adapted to given applications. For example, an improved estimation of the probability of occurrence of a trigram uvw is determined in accordance with the formula $$p(w|uv) = \frac{1}{Z_\lambda} p_{spez}(w)^{\lambda_{spez,1}} p_{allg}(w)^{\lambda_{allg,1}}$$

-continued
$$p_{spez}(w|v)^{\lambda_{spec,2}} p_{allg}(w|v)^{\lambda_{allg,2}} p_{allg}(w|uv)^{\lambda_{allg,3}}$$

The unigram probability $p_{allg}(w)$, the bigram probability $p_{allg}(w|v)$ and the trigram probability $p_{allg}(w|uv)$ are determined on the basis of an evaluation of the above-mentioned general training vocabulary corpus. The specific training vocabulary corpus is split up in two parts. The first part is used for determining the unigram probability $p_{spez}(w)$ and the bigram probability $p_{spez}(w|v)$. The other second part of the specific training vocabulary corpus is used in the manner described above for determining the optimized parameter values $\lambda_i$.

A second preferred use of the invention is the combination of probabilities of different M grams of one or more training vocabulary corpuses for an improved estimation of a probability of occurrence of a speech vocabulary element. An example of such a use is the determination of the probability of occurrence p(w|uv) for a trigram uvw in accordance with $$p(w|uv) = \frac{1}{Z_\lambda} p(w)^{\lambda_{uni}} p_{d1}(w|v)^{\lambda_{d1}} p_{d2}(w|u)^{\lambda_{d2}}$$

in which p(w) is the unigram probability for the speech vocabulary element w, $p_{d1}$ is the probability of the bigram vw and $p_{d2}(W|u)$ is the gap bigram probability for the gap bigram uw. $\lambda_{uni}$, $\lambda_{d1}$ and $\lambda_{d2}$ represent the corresponding optimized parameter values.

If only M-gram probabilities with M<3, i.e. only bigrams are used, the required memory space can be reduced. In that case, "normal" bigrams and/or gap bigrams are used as bigrams. The reduction which is hereby to be achieved as regards error rate and perplexity values of the speech recognition system is sufficient for many applications.

What is claimed is:

1. A method of estimating probabilities of occurrence of speech vocabulary elements in a speech recognition system, wherein, in the estimation of a probability of occurrence of a speech vocabulary element, several M-gram probabilities of this element are raised to a higher power by means of an M-gram-specific optimized parameter value, and the powers thus obtained are multiplied by each other, in which the estimation of the probability of occurrence of a speech vocabulary element does not include the case where an M-gram probability with M>1 estimated by means of a first training vocabulary corpus for the speech vocabulary element is multiplied by a quotient raised to the power of an optimized parameter value, which optimized parameter value is determined by means of the GIS algorithm, and a unigram probability of the element estimated by means of a second training vocabulary corpus serves as a dividend of the quotient, and a unigram probability of the element estimated by means of the first training vocabulary corpus serves as a divisor of the quotient.

2. A method as claimed in claim 1, wherein a first training vocabulary corpus is used for estimating a first part of the M-gram probabilities, and a first part of a second training vocabulary corpus is used for estimating a second part of the M-gram probabilities, and a second part of the second training vocabulary corpus is used for determining the optimized parameter values assigned to the M-gram probabilities.

3. A method as claimed in claim 2, wherein, for determining the optimized parameter values, the optimizing function $$F(\{\lambda_i\}) = \sum_{hw} f(hw) \log \left( \frac{1}{Z_\lambda(h)} \prod_i p_i(w|h)^{\lambda_i} \right)$$

is minimized, wherein $\lambda_i$ represents the parameter values to be optimized, hw represents M-grams for a vocabulary element w with a history h of previous vocabulary elements, f(hw) represents the quotient with the number of counted M-grams occurring in a training phase of the second part of the second vocabulary as a dividend, and the number of vocabulary elements of the second vocabulary as a divisor, $1/Z_\lambda(h)$ represents a scaling factor, and pi represents the estimated probability of occurrence of the vocabulary element w, given the history h.

4. A method as claimed in claim 1, wherein only M-gram probabilities with M<3 are used.

5. A method as claimed in claim 4, wherein gap bigram probabilities are used.

6. A speech recognition system using a speech vocabulary with vocabulary elements to which probabilities of occurrence are assigned, which are estimated by means of a method as claimed in claim 1.

\* \* \* \* \*